(12) United States Patent
Li et al.

(10) Patent No.: US 12,424,225 B2
(45) Date of Patent: Sep. 23, 2025

(54) LECTURER SPEECH SIGNAL PROCESSING

(71) Applicant: Habitat Learn Ltd, Woking (GB)

(72) Inventors: Yunjia Li, Chandler's Ford (GB); Jeremy Guy Brassington, Woking (GB); Daniel Jeffery Goerz, Toronto (CA)

(73) Assignee: Habitat Learn Ltd, Woking (GB)

( * ) Notice: Subject to any disclaimer, the term of this patent is extended or adjusted under 35 U.S.C. 154(b) by 191 days.

(21) Appl. No.: 18/446,280

(22) Filed: Aug. 8, 2023

(65) Prior Publication Data
US 2024/0412737 A1   Dec. 12, 2024

(30) Foreign Application Priority Data
Jun. 7, 2023  (GB) ...................................... 2308481

(51) Int. Cl.
*G10L 17/18*  (2013.01)
*G10L 15/26*  (2006.01)
*G10L 17/00*  (2013.01)
*G10L 17/04*  (2013.01)
*G10L 17/22*  (2013.01)
(Continued)

(52) U.S. Cl.
CPC .............. *G10L 17/18* (2013.01); *G10L 15/26* (2013.01); *G10L 17/00* (2013.01); *G10L 17/04* (2013.01); *G10L 17/22* (2013.01); *G10L 21/0208* (2013.01); *G10L 21/10* (2013.01)

(58) Field of Classification Search
CPC ......... G10L 15/26; G10L 17/00; G10L 17/04; G10L 17/18; G10L 17/22
See application file for complete search history.

(56) References Cited

U.S. PATENT DOCUMENTS

2007/0071206 A1\* 3/2007 Gainsboro ........ H04M 3/42221
                                                           379/168
2014/0195229 A1\* 7/2014 Charugundla ..............................
                                                        H04N 21/234336
                                                              704/235

(Continued)

OTHER PUBLICATIONS

Rituerto-González, Esther, and Carmen Pelaez-Moreno. "End-to-end recurrent denoising autoencoder embeddings for speaker identification." Neural Computing and Applications 33.21 (2021): 14429-14439. (Year: 2021).\*

(Continued)

*Primary Examiner* — Shaun Roberts
(74) *Attorney, Agent, or Firm* — Stoel Rives LLP (57) ABSTRACT

A sound signal is received from a room of people, the sound signal including speech of a lecturer. A Fourier transform is applied to the sound signal to produce a spectrogram. An encoding of the spectrogram in a multi-dimensional space is computed using an encoder. A seed is found in the multi-dimensional space, where the seed is a position in the multi-dimensional space which encodes a spectrogram from another lecturer known to have performance on an automated speech recognition tool above a threshold. The encoding is modified by moving the location of the encoding in the multi-dimensional space towards the seed. The modified encoding is decoded into a decoded signal. A reverse Fourier transform is applied to the decoded signal to produce an output sound signal. The output sound signal is sent to the automated speech recognition tool to generate a transcript.

20 Claims, 5 Drawing Sheets

(51) Int. Cl.
    *G10L 21/0208*    (2013.01)
    *G10L 21/10*       (2013.01)

(56) References Cited

U.S. PATENT DOCUMENTS

| | | | | |
|---|---|---|---|---|
| 2017/0287482 | A1* | 10/2017 | Jackson | G10L 15/26 |
| 2019/0318757 | A1* | 10/2019 | Chen | G10L 19/022 |
| 2020/0106813 | A1* | 4/2020 | Vendrow | H04L 65/4015 |
| 2020/0296521 | A1* | 9/2020 | Wexler | G06F 3/167 |
| 2020/0321007 | A1* | 10/2020 | Stoker | G10L 15/26 |
| 2020/0372897 | A1* | 11/2020 | Battenberg | G10L 13/10 |
| 2021/0150925 | A1* | 5/2021 | Birchfield | G09B 5/00 |
| 2021/0225391 | A1* | 7/2021 | Wexler | H04R 1/342 |
| 2022/0122579 | A1* | 4/2022 | Biadsy | G10L 13/08 |
| 2022/0310056 | A1 | 9/2022 | Ramabhadran et al. | |
| 2023/0061617 | A1* | 3/2023 | Fainstein | G06F 21/32 |
| 2023/0206925 | A1* | 6/2023 | Havdan | G10L 17/18 |
| | | | | 704/200 |
| 2024/0185861 | A1* | 6/2024 | Weston | G10L 17/22 |

OTHER PUBLICATIONS

Office Action for GB application 2308481.7 dated Dec. 8, 2023. p. 5.

Hsu, Wei-Ning, et al., "Unsupervised Domain Adaptation for Robust Speech Recognition via Variational Autoencoder-Based Data Augmentation", IEEE Automatic Speech Recognition & Understanding Workshop, 2017, pp. 8.

Huang, et al., "Unsupervised Representation Disentanglement Using Cross Domain Features and Adversarial Learning in Variational Autoencoder Based Voice Conversion", IEEE Transactions on Emerging Topics in Computational Intelligence, vol. 4, No. 4, Aug. 2020, 2020, pp. 468-479.

Extended European Search Report dated Sep. 18, 2024 for EP Application 24175615.4. pp. 7.

Yakovenko, et al., "Convolutional Variational Autoencoders for Audio Feature Representation in Speech Recognition Systems", Springer Nature Switzerland | https://doi.org/10.1007/978-3-030-63000-3_5, Dec. 7, 2020, pp. 54-66.

* cited by examiner

LECTURER SPEECH SIGNAL PROCESSING

CROSS-REFERENCE TO RELATED APPLICATION(S)

This application claims priority to UK Application No. 2308481.7 filed Jun. 7, 2023, which is incorporated herein by referenced, in its entirety, for any purpose.

TECHNICAL FIELD

The present disclosure relates to apparatus for use in lecture rooms and classrooms for processing lecturer speech signals, such as for obtaining transcripts of lecturer speech.

BACKGROUND

Accessibility for learners in classroom and lecture room environments is often hampered or restricted for a variety of reasons. Where a single lecturer speaks to a room full of students there can be difficulties for individual ones of the students who struggle with hearing and/or understanding the speech as well as trying to take notes at the same time.

Automated speech recognition is one option to facilitate learning. However, many existing tools suffer from bias whereby performance is poor for speakers with voices dissimilar to those used to train machine learning automated speech recognition tools. Words are incorrectly recognized (i.e. transcribed as the wrong word) or are not recognized at all in some cases. The result is confusing for students who are already struggling to learn.

The examples described herein are not limited to examples which solve problems mentioned in this background section.

SUMMARY

Examples of preferred aspects and embodiments of the invention are as set out in the accompanying independent and dependent claims.

To overcome the problem of bias in existing automated speech recognition tools, the present technology modifies lecturer speech signals to become similar to speech signals of other lecturers with voices that perform well on the automated speech recognition tool. The modification is done in an efficient manner, optionally in portable lecture room equipment without access to the internet.

A sound signal is received from a room of people, the sound signal including speech of a lecturer. A Fourier transform is applied to the sound signal to produce a spectrogram. An encoding of the spectrogram in a multi-dimensional space is computed using an encoder. A seed is found in the multi-dimensional space, where the seed is a position in the multi-dimensional space which encodes a spectrogram from another lecturer known to have performance on an automated speech recognition tool above a threshold. The encoding is modified by moving the location of the encoding in the multi-dimensional space towards the seed. The modified encoding is decoded into a decoded signal. A reverse Fourier transform is applied to the decoded signal to produce an output sound signal. The output sound signal is sent to the automated speech recognition tool to generate a transcript.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an aspect there is a computer-implemented method comprising:
receiving a sound signal from a room of people, the sound signal including speech of a lecturer;
applying a Fourier transform to the sound signal to produce a spectrogram;
computing an encoding of the spectrogram in a multi-dimensional space using an encoder;
searching for a seed in the multi-dimensional space, where the seed is a position in the multi-dimensional space which encodes a spectrogram from another lecturer known to have performance on an automated speech recognition tool above a threshold;
modifying the encoding by moving the location of the encoding in the multi-dimensional space towards the seed;
decoding the modified encoding into a decoded signal;
applying a reverse Fourier transform to the decoded signal to produce an output sound signal;
sending the output sound signal to the automated speech recognition tool to generate a transcript.

The method is efficient and enables input to be provided to an automated speech recognition tool so as to obtain an accurate transcript.

In examples, prior to applying the Fourier transform, the sound signal is filtered to remove noise.

In some cases speech features are extracted from the spectrogram and wherein computing the encoding of the spectrogram comprises computing an encoding of the speech features using the encoder.

For example, the speech features are extracted using any of: Mel-filters, Perceptual linear prediction PLP, linear predictive coding LPC.

In some cases searching for a seed comprises searching for a seed which is within a threshold distance of the encoded spectrogram in the multi-dimensional space.

In an example searching for a seed comprises searching a plurality of seeds to find a seed closest to the encoded spectrogram in the multi-dimensional space.

A Manhattan distance metric is used in some cases to find a seed closest to the encoded spectrogram.

In examples the seed is from a database of seeds, each seed encoding a spectrogram from a different lecturer known to have performance on an automated speech recognition tool above a threshold.

In an example the method further comprises using electronic circuitry to perform a Fast Fourier Transform to generate the spectrogram.

In examples the method comprises searching for more than one seed in the multi-dimensional space, where the seeds are within a threshold distance of the encoded spectrogram, and modifying the encoding to by moving the location of the encoding in the multi-dimensional space towards an aggregated position of the seeds found as a result of the searching.

In examples the encoder and the decoder are an autoencoder and the autoencoder has been trained using a reconstruction loss.

In some cases the encoder and the decoder are a variational autoencoder.

In examples a portable device performs the method in a lecture theatre without sending data to a cloud service.

In some cases the sound data is collected using a lecture capture device in a lecture room or classroom.

In examples a transcript of the speech is received from the automated speech recognition tool and displayed on a display device in the room.

In an example the transcript is the transcript of a lecture and the transcript is used to generate captions or notes relating to lecture content.

According to an aspect there is an apparatus for use in a lecture room comprising:
a microphone;
a processor; and
a computer-readable medium storing instructions that are operative upon execution by the processor to:
receive a sound signal from the microphone, the sound signal including speech of a lecturer;
apply a Fourier transform to the sound signal to produce a spectrogram;
compute an encoding of the spectrogram in a multi-dimensional space using an encoder;
searching for a seed in the multi-dimensional space, where the seed is a position in the multi-dimensional space which encodes a spectrogram from another lecturer known to have performance on an automated speech recognition tool above a threshold;
modify the encoding by moving the location of the encoding in the multi-dimensional space towards the seed;
decoding the modified encoding into a decoded signal; and
apply a reverse Fourier transform to the decoded signal to produce an output sound signal;
send the output sound signal to the automated speech recognition tool to generate a transcript.

In examples the apparatus is a portable device suitable for use in a lecture room.

In examples there is a computer program comprising instructions which, when the program is executed by a computer, cause the computer to implement the method of any of the methods described above.

It will also be apparent to anyone of ordinary skill in the art, that some of the preferred features indicated above as preferable in the context of one of the aspects of the disclosed technology indicated may replace one or more preferred features of other ones of the preferred aspects of the disclosed technology. Such apparent combinations are not explicitly listed above under each such possible additional aspect for the sake of conciseness.

Other examples will become apparent from the following detailed description, which, when taken in conjunction with the drawings, illustrate by way of example the principles of the disclosed technology.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

Automated speech recognition tools are widely available such as Dragon Dictation (trade mark), Google voice search (trade mark), Microsoft Cortana (trade mark), Siri personal assistant (trade mark), Alexa Amazon Echo (trade mark), SILVIA and others. However, these tools are found to perform poorly or with variable accuracy in lecture room environments. Lecture rooms, due to their size and layout often produce echo and/or variable scattering and absorption of sound. Lecture rooms such as classrooms are often in buildings where there is a lot of ambient noise due to physical proximity of busy corridors, sports grounds, dining areas, other classrooms and so on. Lecture rooms are often designed with high ceilings and contain furniture and equipment which treats sound in unexpected ways. Lecture rooms are occupied by many students and so the ambient noise in a lecture room is significant.

Automated speech recognition tools also exhibit bias where these tools are created using machine learning technologies (which is the case for the tools widely available today). The biases result in weak performance for lecturers with voices dissimilar to those voices used to train machine learning automated speech recognition tools. The biases arise for a variety of reasons including: bias in training examples used to train the automated speech recognition tool, bias in algorithms in the automated speech recognition tool, bias in labels where the training examples are labelled by human judges with inherent bias.

As a result of the bias it is difficult to achieve accurate automated speech recognition for lecturers with voices, accents, age groups, health conditions of particular types. The combination of the bias and the acoustic properties and ambient noise experienced in lecture rooms makes it particularly difficult to perform accurate speech to text processing for lecturers.

The inventors have recognized this problem and have developed a way of applying signal processing to a sound signal captured in a lecture room so as to improve the accuracy of existing tools at computing text from the lecture room sound signals.

Figure 1:
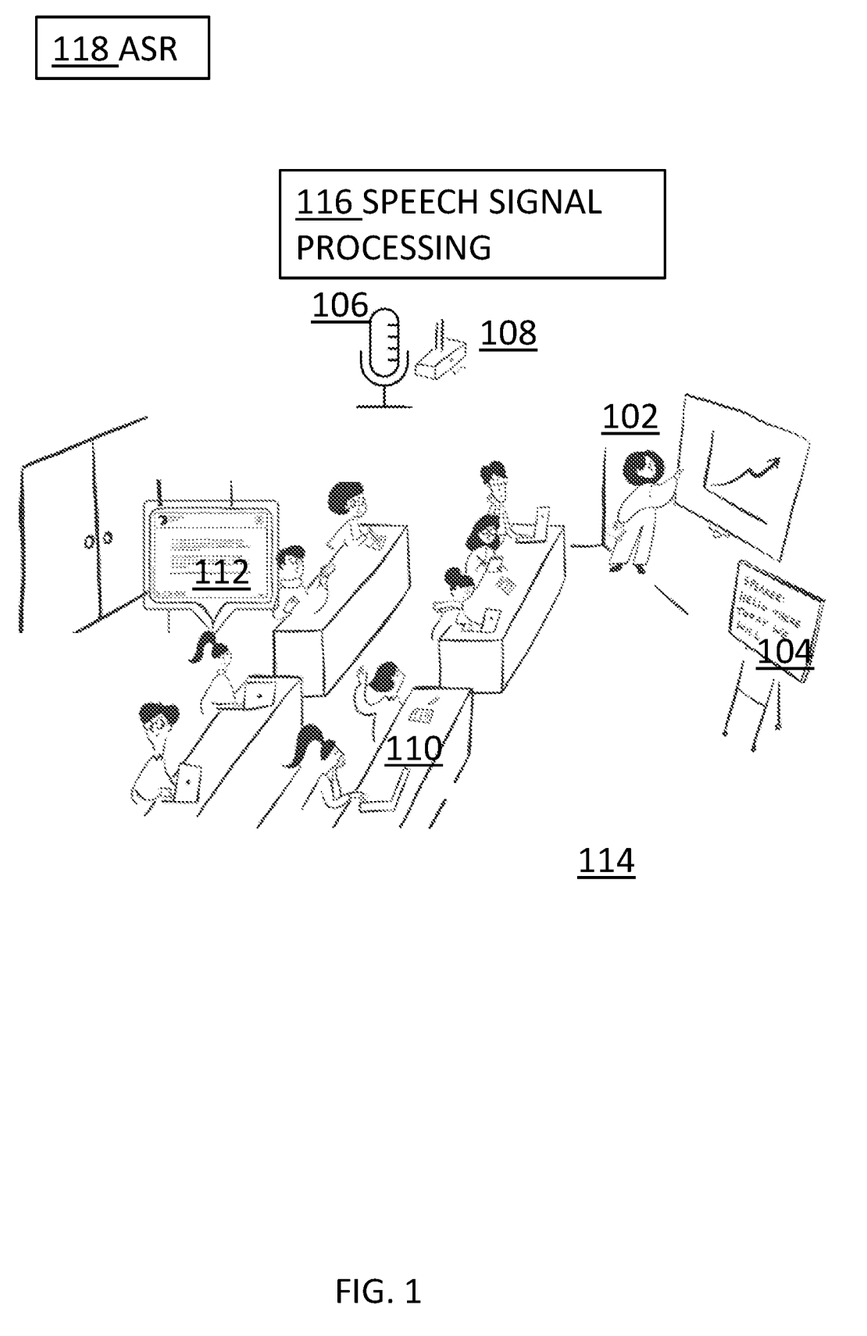
FIG. 1 is a schematic diagram of a lecture room with lecture speech signal processing apparatus.

FIG. 1 is a schematic diagram of a lecture room 114 with lecture speech signal processing apparatus 116. The speech signal processing apparatus 116 is portable and in some cases is ceiling or wall mounted in the lecture room 114. There is a microphone 106 and optionally a video camera 108 both of which are wall or ceiling mounted. In some cases the microphone is worn by a lecturer 102. The speech signal processing apparatus 116 is computer implemented and is described in more detail with reference to FIG. 5. The speech signal processing apparatus 116 receives sound signals from the microphone 106 via a wired or wireless connection.

A plurality of students in the lecture room are watching a lecturer 102 explain a graph which is displayed on a screen on a wall of the room. Some of the students have their own laptop computer 110, tablet computer or other portable computing device in order to view a transcription of the lecturer's speech to facilitate their learning. Student 112 sees a transcription at her laptop. The transcription is also displayed at a display 104 visible to all the students.

The transcription is computed by sending a sound signal captured using microphone 106 to an automated speech recognition tool 118 which may be in the cloud or may be in a computing device in the lecture room. The automated speech recognition tool may be any machine learning based automated speech recognition tool such as any of those mentioned earlier in this document or a future automated speech recognition tool.

The accuracy of the transcription is found to be below a threshold for some lecturers and for some combinations of lecture room and lecturer. The threshold is a word accuracy rate in some cases. By using the speech signal processing apparatus 116 it is possible to process sound signals from the lecture room before they are input to the automated speech recognition tool 118 and so to improve the word accuracy rate. The speech signal processing apparatus 116 is portable in some cases and in some cases is operable without an internet connection. In some examples the word accuracy rate is monitored live, such as by the lecturer making a user input to indicate the word accuracy rate is unacceptable. The sound signal is then processed using the speech signal processing apparatus 116 before being sent to the automated speech recognition tool 118. The live monitoring facilitates efficiency and saves power. In other cases the sound signal is always processed using the speech signal processing apparatus before being sent to the automated speech recognition tool.

Figure 2:
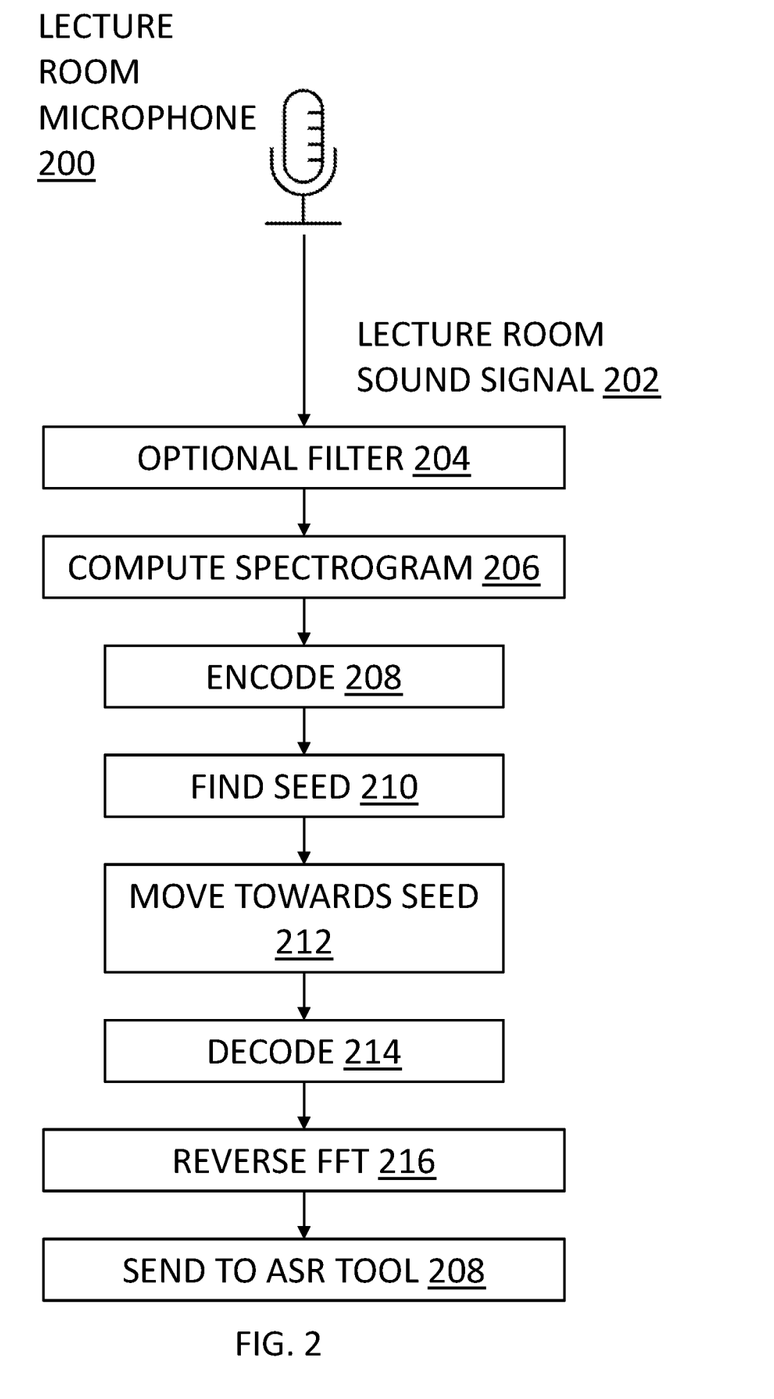
FIG. 2 is a flow diagram of a method performed by lecturer speech signal processing apparatus.

FIG. 2 is a flow diagram of a method performed by lecturer speech signal processing apparatus 116 such as that of FIG. 1. A lecture room sound signal 202 is received from a lecture room microphone 200. In an example, the lecture room sound signal is sent using a wired or wireless connection. In some cases, the microphone is integral with the speech signal processing apparatus. The lecture room sound signal 202 includes sound from speech of a lecturer in the lecture room as well as noise and ambient sound. In some examples, the speech of the lecturer is of the lecturer speaking a specified text which is the same text used to measure seed examples as described in more detail below.

The lecture room sound signal is optionally filtered 204 to remove noise. Any suitable noise filter is used such as a high pass filter and a low pass filter.

The lecture room sound signal is processed using a Fourier transform to compute 206 a spectrogram. The spectrogram is a compressed representation of the sound signal 202 and indicates which frequencies of sound are present in the signal as it varies with time. In some cases the Fourier transform is applied to a digital version of the sound signal using circuitry in the speech signal processing apparatus 116.

The spectrogram is encoded 208 using an encoder which is part of an autoencoder. The encoder computes an encoding of the spectrogram in a multi-dimensional space. The encoding is a compressed representation of the spectrogram. The autoencoder has previously been trained as described in more detail with reference to FIG. 3 and it acts to encode spectrograms into the multi-dimensional space so that spectrograms which are similar are closer together in the multi-dimensional space.

The speech signal processing apparatus 116 searches for a seed in the multi-dimensional space, where the seed is a position in the multi-dimensional space which encodes a spectrogram from another lecturer known to have performance on the automated speech recognition tool 118 above a threshold. Searching for the seed comprises searching for a seed which is within a threshold distance of the encoded spectrogram in the multi-dimensional space. The distance may be measured using a Manhattan distance metric or other distance metric. Using a Manhattan distance metric is useful for multi-dimensional spaces. In some cases the search aims to find a seed which is closest to the encoded spectrogram. The search searches through a plurality of seeds which are obtained in advance (and optionally stored in a database) as explained in more detail with reference to FIG. 4. Each seed is an encoding of a spectrogram from a different lecturer known to have performance on the automated speech recognition tool which is above a threshold (such as when speaking a specified text).

Once a seed has been found 210 the encoding of the spectrogram is modified by moving 212 the location of the encoding in the multi-dimensional space towards the seed. The encoding may be moved a fraction of the way towards the seed such as 0.5 of the way towards the seed.

The modified encoding is decoded 214 to produce a decoded signal. The decoding is done using a decoder of the autoencoder. The decoder has been trained as part of the autoencoder as described with reference to FIG. 3. The decoded signal is a spectrogram representing a speech signal of a voice that is more similar to the seed voice than the lecturer's speech.

A reverse Fourier transform is applied 216 to the decoded signal to produce an output sound signal which is a speech signal that can be considered "synthetic" since the speech signal is a modified version of the original lecturer speech signal. The reverse Fourier transform is a reverse fast Fourier transform in some cases. The reverse Fourier transform is applied using circuitry in the speech signal processing apparatus 116.

The output sound signal is sent 208 to the automated speech recognition tool. The automated speech recognition tool then computes a transcription. The transcription has a higher word accuracy rate than the transcription of the lecture room sound signal 202 without the processing by the speech signal processing apparatus 116.

In some examples, the operation of computing the spectrogram 206 comprises additional operations. In these cases speech features are extracted from the spectrogram and the speech features are input to the encoder to compute the encoding. The speech features are extracted from the spectrogram using any of: Mel-filters, Perceptual linear prediction PLP, linear predictive coding LPC. Mel-filters are used to compute low-order Mel-Frequency Cepstral Coefficients MRCC to represent articulation in speech. This may generate 39 articulation features as follows:

12 MFCC features plus speech energy value;
Delta-MFCC: subtraction of MFCC value from consecutive frames;
Second derivative of MFCC changes (also called delta-delta-MFCC);
For each of a plurality of time windows of the sound signal, those three MFCC vectors are combined into one big 36-dimension vector to represent the features of the articulation. MFCC will largely filter out the nonspeech noise, but won't completely remove it especially for noise similar to the speech frequency.

By using speech features it is possible to reduce the effects of noise and to improve accuracy.

The process of FIG. 2 is modified in some cases by searching for more than one seed. The search finds two or more seeds which are all within a threshold distance of the encoded spectrogram in the multi-dimensional space. The encoding is modified by moving the location of the encoding in the multi-dimensional space towards an aggregated position of the seeds found as a result of the searching.

As mentioned above, the encoder and the decoder together form an autoencoder. Both the encoder and the decoder are neural networks which have been trained together using a reconstruction loss. In some cases the autoencoder is a variational autoencoder. Using a variational autoencoder gives a benefit of improved accuracy in terms of word accuracy rate.

An autoencoder is a type of neural network comprising an encoder and a decoder. The encoder transforms input data to an encoded representation and the decoder recreates the input data from the encoded representation. The encoded representation is compressed; that is, the encoded representation has a lower dimensionality than the input data. Both the encoder and the decoder are neural networks. In an example, the encoder is a multi-layer neural network such as with more than 3 fully connected hidden layers and the decoder mirrors the architecture of the encoder. By using multi-layer neural networks for the encoder and the decoder computation costs of encoding and of training may be reduced and performance may be increased. In an example the autoencoder is an open source autoencoder such as from the MATLAB Deep Learning Toolbox (trade mark).

A variational autoencoder is also a neural network with an encoder and a decoder which are trained together. It is a generative model with a prior and a noise distribution.

Figure 3:
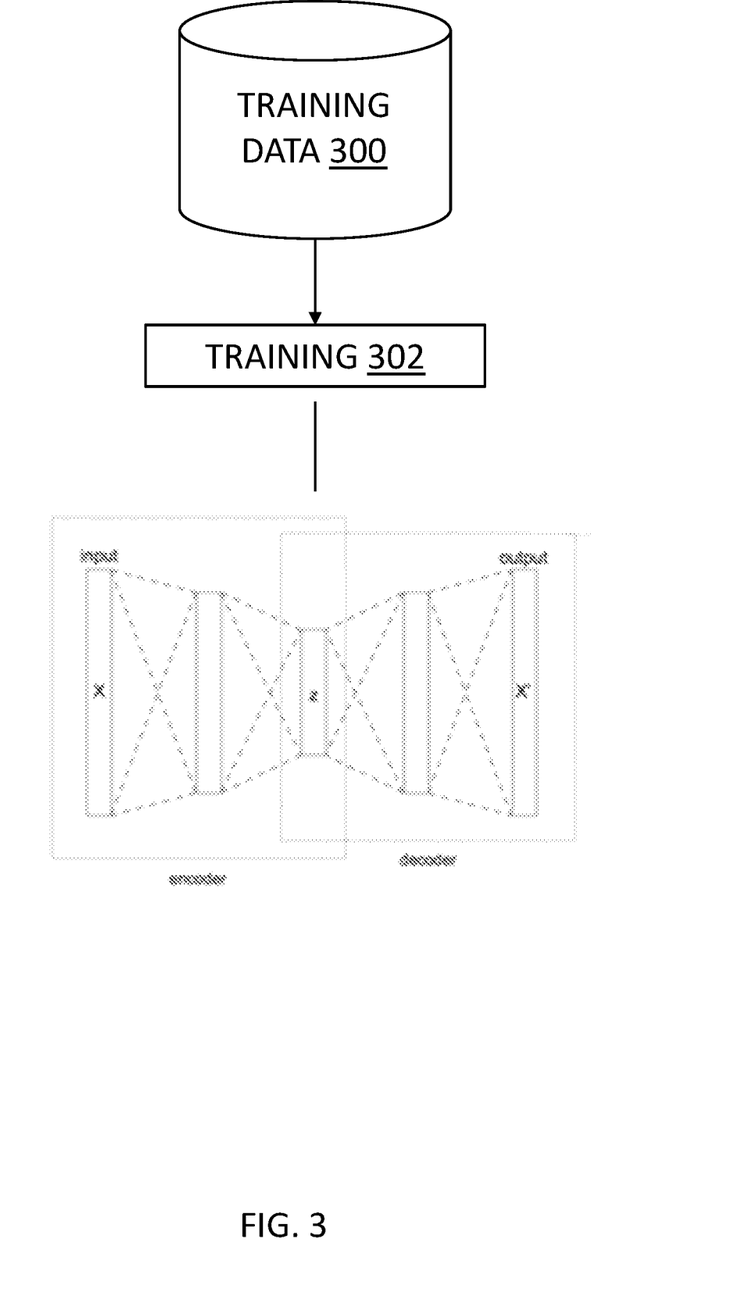
FIG. 3 is a flow diagram of a method of training an autoencoder.

FIG. 3 is a flow diagram of a method of training an autoencoder. Training data 300 is available comprising speech signals of lecturers recorded in lecture rooms. Tens of thousands of speech signals are available or more. The speech signals are of lecturers speaking any content; it does not have to be the same content for each lecturer. Since the training data is obtained empirically and is unlabelled it is straightforward to obtain plentiful training data.

Training 302 is carried out using backpropagation and to optimize a reconstruction loss. A reconstruction loss is a measure of the difference between a training example input to the encoder and a reconstruction of the training example computed by the decoder.

In the case that the autoencoder is a variational autoencoder the process of FIG. 3 uses a training algorithm such as the Expectation-Maximization meta-algorithm. The variational autoencoder is trained using both a reconstruction loss and a Kullback-Leibler divergence. An example of a variational autoencoder (VAE) which may be used is the open source Pytorch VAE.

Figure 4:
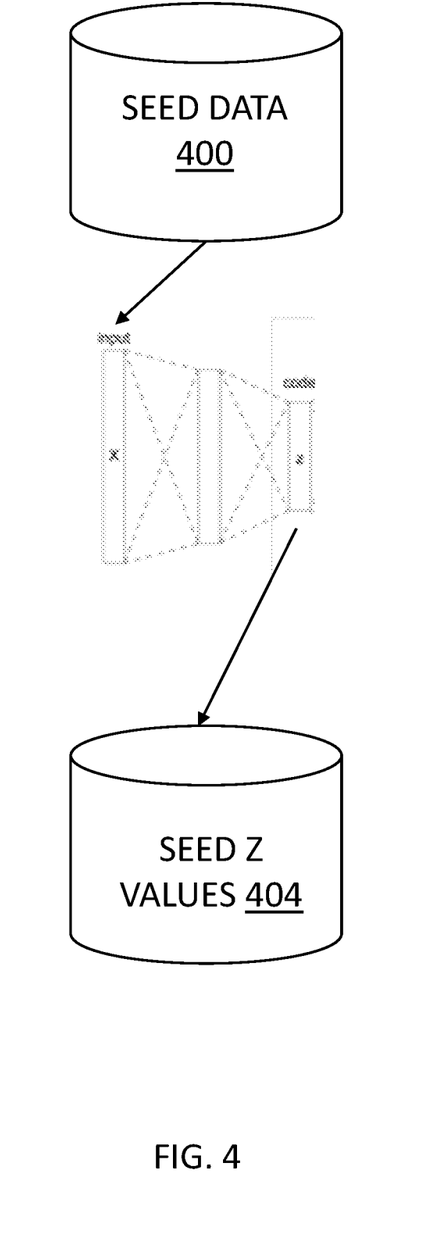
FIG. 4 is a flow diagram of a method of computing seed values.

FIG. 4 is a flow diagram of a method of computing seed values. A plurality of lecturers are found who give high word accuracy rate on the same automated speech recognition tool 118. These lecturers are each given a same paragraph of text to read in a lecture room. The lecture room may be the same lecture room or different lecture rooms. Sound signals are captured of the lecturers reading the paragraph. This is done for tens or scores of lecturers. The sound signals are processed using a Fourier transform to compute spectrograms and the spectrograms are stored in a store 400 and referred to as seed data. Each of the spectrograms from seed data store 400 is encoded using the encoder of the trained autoencoder (trained using the process of FIG. 3). The encodings are referred to as z values and are stored in store 404. Each z value may be in vector format. Because the lecturers speak the same paragraph the differences between the z values will be due to differences in the voices, accents and articulation of the lecturers rather than due to the content of the speech.

Figure 5:
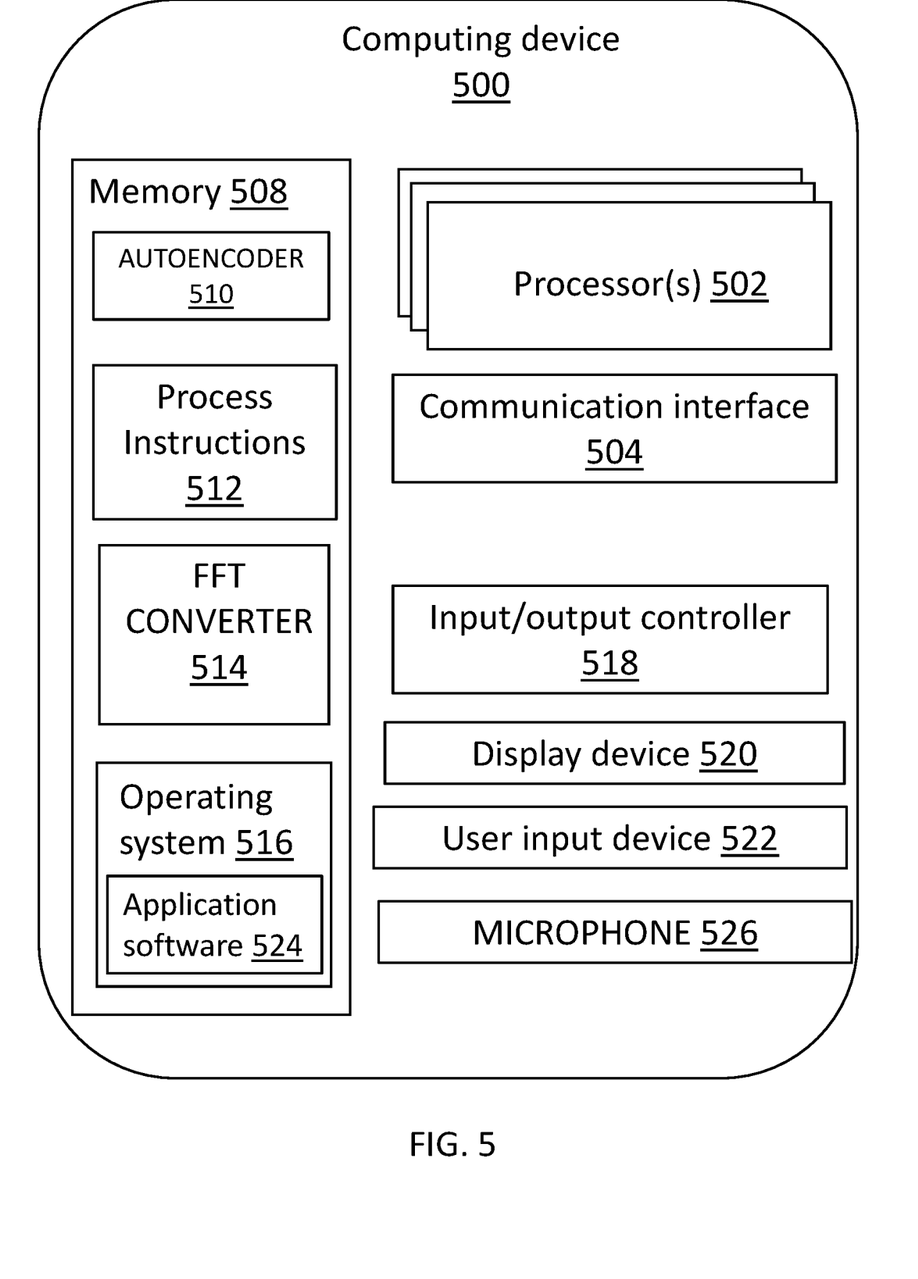
FIG. 5 is a schematic diagram of a computing device for implementing a lecturer speech signal processing apparatus.

FIG. 5 is a schematic diagram of a computing device 500 for implementing a lecturer speech signal processing apparatus. The computing device is portable and suitable for use in a lecture room. It has a housing which is preferably tamper proof and may have fixings to enable the computing device to be wall or ceiling mounted. In some cases the computing device 500 is sized and shaped to be supported on a desk or shelf in a lecture room.

The computing device 500 comprises one or more processors 502 which are microprocessors, controllers or any other suitable type of processors for processing computer executable instructions to control the operation of the device in order to process sound signals from a lecture room such as to perform the methods of FIGS. 2 to 4. In some examples, for example where a system on a chip architecture is used, the processors 502 include one or more fixed function blocks (also referred to as accelerators) which implement a part of the method of FIGS. 2 to 4 in hardware (rather than software or firmware). That is, the methods described herein are implemented in any one or more of software, firmware, hardware. The computing device has a Fourier transform converter 514 to apply a Fourier transform to a signal or to compute a reverse Fourier transform. The computing device has a microphone 526 or has functionality (such as input/output controller 518) to receive a signal from a microphone. The computing device an autoencoder 510. Platform software comprising an operating system 516 or any other suitable platform software is provided at the computing-based device to enable application software 524 to be executed on the device such as an automated speech recognition tool in some cases. Process instructions 512 implement methods such as that of FIG. 2 to process a sound signal. Although the computer storage media (memory 508) is shown within the computing-based device 500 it will be appreciated that the storage is, in some examples, distributed or located remotely and accessed via a network or other communication link (e.g. using communication interface 504).

The computing-based device 500 also comprises an input/output controller 518 arranged to output display information to a display device 520 which may be separate from or integral to the computing-based device 500. The display information may provide a graphical user interface and may display a text transcription and/or a word accuracy rate. The input/output controller 518 is also arranged to receive and process input from one or more devices, such as a user input device 522 (e.g. a mouse, keyboard, camera, microphone or other sensor). In some examples the user input device 520 detects voice input, user gestures or other user actions. In an embodiment the display device 520 also acts as the user input device 522 if it is a touch sensitive display device. The input/output controller 518 outputs data to devices other than the display device in some examples.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A computer-implemented method comprising:
   receiving a sound signal from a room of people, the sound signal including speech of a lecturer;
   applying a Fourier transform to the sound signal to produce a spectrogram;
   computing an encoding of the spectrogram in a multi-dimensional space using an encoder;
   searching for a seed in the multi-dimensional space, where the seed is a position in the multi-dimensional space which encodes a spectrogram from another lecturer known to have performance on an automated speech recognition tool above a threshold;
   modifying the encoding by moving the location of the encoding in the multi-dimensional space towards the seed;
   decoding the modified encoding into a decoded signal;
   applying a reverse Fourier transform to the decoded signal to produce an output sound signal;
   sending the output sound signal to the automated speech recognition tool to generate a transcript.

2. The method as claimed in claim 1 comprising, prior to applying the Fourier transform, filtering the sound signal to remove noise.

3. The method as claimed in claim 1 comprising extracting speech features from the spectrogram and wherein computing the encoding of the spectrogram comprises computing an encoding of the speech features using the encoder.

4. The method as claimed in claim 3 comprising extracting the speech features using any of: Mel-filters, Perceptual linear prediction PLP, linear predictive coding LPC.

5. The method as claimed in claim 1 wherein searching for a seed comprises searching for a seed which is within a threshold distance of the encoded spectrogram in the multi-dimensional space.

6. The method as claimed in claim 1 wherein searching for a seed comprises searching a plurality of seeds to find a seed closest to the encoded spectrogram in the multi-dimensional space.

7. The method of claim 6 comprising using a Manhattan distance metric to find a seed closest to the encoded spectrogram.

8. The method of claim 1, wherein the seed is from a database of seeds, each seed encoding a spectrogram from a different lecturer known to have performance on an automated speech recognition tool above a threshold.

9. The method of claim 1 wherein the method further comprises using electronic circuitry to perform a Fast Fourier Transform to generate the spectrogram.

10. The method of claim 1 comprising searching for more than one seed in the multi-dimensional space, where the seeds are within a threshold distance of the encoded spectrogram, and modifying the encoding to by moving the location of the encoding in the multi-dimensional space towards an aggregated position of the seeds found as a result of the searching.

11. The method of claim 1 wherein the encoder and the decoder are an autoencoder and the autoencoder has been trained using a reconstruction loss.

12. The method of claim 1 wherein the encoder and the decoder are a variational autoencoder.

13. The method of claim 1 performed by a portable device in a lecture theatre without sending data to a cloud service.

14. The method of claim 1 wherein the sound signal is collected using a lecture capture device in a lecture room or classroom.

15. The method of claim 1 comprising receiving a transcript of the speech from the automated speech recognition tool and displaying the transcript on a display device in the room.

16. The method of claim 1 wherein the transcript is the transcript of a lecture and the transcript is used to generate captions or notes relating to lecture content.

17. An apparatus for use in a lecture room comprising:
    a microphone;
    a processor; and
    a computer-readable medium storing instructions that are operative upon execution by the processor to:
    receive a sound signal from the microphone, the sound signal including speech of a lecturer;
    apply a Fourier transform to the sound signal to produce a spectrogram;
    compute an encoding of the spectrogram in a multi-dimensional space using an encoder;
    searching for a seed in the multi-dimensional space, where the seed is a position in the multi-dimensional space which encodes a spectrogram from another lecturer known to have performance on an automated speech recognition tool above a threshold;
    modify the encoding by moving the location of the encoding in the multi-dimensional space towards the seed;
    decoding the modified encoding into a decoded signal; and
    apply a reverse Fourier transform to the decoded signal to produce an output sound signal;
    send the output sound signal to the automated speech recognition tool to generate a transcript.

18. The apparatus as claimed in claim 17 which is a portable device suitable for use in a lecture room.

19. The apparatus as claimed in claim 17 comprising electronic circuitry to perform a Fast Fourier Transform to generate the spectrogram.

20. A portable device for use in a lecture room comprising:
- a microphone;
- a processor; and
- a computer-readable medium storing instructions that are operative upon execution by the processor to:
- receive a sound signal from the microphone, the sound signal including speech of a lecturer;
- apply a Fourier transform to the sound signal to produce a spectrogram;
- compute an encoding of the spectrogram using an encoder;
- search for a seed, where the seed encodes a spectrogram from another lecturer known to have performance on an automated speech recognition tool above a threshold;
- modify the encoding by moving the location of the encoding in a multi-dimensional space towards the seed;
- decoding the modified encoding into a decoded signal; and
- apply a reverse Fourier transform to the decoded signal to produce an output sound signal;
- send the output sound signal to the automated speech recognition tool to generate a transcript.

\* \* \* \* \*